United States Patent
You et al.

(10) Patent No.: US 9,398,200 B2
(45) Date of Patent: Jul. 19, 2016

(54) WAVELENGTH SEPARATION DEVICE AND 3-DIMENSIONAL IMAGE ACQUISITION APPARATUS INCLUDING THE SAME

(71) Applicant: SAMSUNG ELECTRONICS CO., LTD., Suwon-si (KR)

(72) Inventors: Jang-woo You, Yongin-si (KR); Yong-hwa Park, Yongin-si (KR); Hee-sun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/337,638

(22) Filed: Jul. 22, 2014

(65) Prior Publication Data

US 2015/0156479 A1    Jun. 4, 2015

(30) Foreign Application Priority Data

Dec. 4, 2013  (KR) ......................... 10-2013-0149996

(51) Int. Cl.
| | |
|---|---|
| *G02B 27/14* | (2006.01) |
| *G02B 27/12* | (2006.01) |
| *H04N 9/07* | (2006.01) |
| *H04N 5/225* | (2006.01) |
| *G02B 27/10* | (2006.01) |
| *G03B 35/00* | (2006.01) |

(Continued)

(52) U.S. Cl.
CPC .............. *H04N 5/2254* (2013.01); *G01S 7/481* (2013.01); *G01S 17/89* (2013.01); *G02B 27/1006* (2013.01); *G03B 35/00* (2013.01); *H04N 5/2256* (2013.01); *H04N 13/0271* (2013.01); *G02B 5/04* (2013.01); *H04N 13/025* (2013.01); *H04N 13/0253* (2013.01)

(58) Field of Classification Search
CPC .............. G02B 27/0025; G02B 27/144; G02B 27/0103; G02B 27/126; G02B 27/145; G02B 3/0056; G02B 5/045; G02B 5/04; G02B 5/06; H04N 5/2254; H04N 9/097; H04N 13/0434; H04N 9/3197; A61F 9/08; G03B 33/14; G03B 21/00; B24B 1/00; B24B 37/042
USPC .................. 359/634, 637–640, 618–619, 621, 359/625–627, 831–834, 496, 602, 359/605–606; 348/335–339, 57–58, 62; 353/20, 31–34, 37, 81–82, 84; 451/28, 451/41; 349/8
See application file for complete search history.

(56) References Cited

U.S. PATENT DOCUMENTS 5,002,365 A * 3/1991 DeJager et al. ............... 359/618
5,914,817 A * 6/1999 Browning et al. ............ 359/634

(Continued)

FOREIGN PATENT DOCUMENTS

KR    10-2012-0045462 A    5/2012

*Primary Examiner* — Dawayne A Pinkney
(74) *Attorney, Agent, or Firm* — Sughrue Mion, PLLC

(57) ABSTRACT

Provided are a wavelength separation device and a 3-dimensional (3D) image acquisition apparatus including the same. The wavelength separation device includes a first prism having an inclined surface and a second prism bonded to a first region of the inclined surface of the first prism. A wavelength separation coating may be disposed at a junction between the first portion of the inclined surface of the first prism and the second prism, and a second portion of the inclined surface of the first prism, different from the first portion, is a total reflection surface that totally internally reflects light.

18 Claims, 6 Drawing Sheets

(51) Int. Cl.
  *G01S 17/89* (2006.01)
  *G01S 7/481* (2006.01)
  *G02B 5/04* (2006.01)
  *H04N 13/02* (2006.01)

(56) References Cited

U.S. PATENT DOCUMENTS

| | | | |
|---|---|---|---|
| 6,704,065 B1 * | 3/2004 | Sharp et al. | 349/5 |
| 7,224,384 B1 | 5/2007 | Iddan et al. | |
| 7,796,340 B2 | 9/2010 | Bloch | |
| 8,344,306 B2 | 1/2013 | Kim | |
| 2004/0150794 A1 * | 8/2004 | Kurtz et al. | 353/31 |
| 2006/0044654 A1 * | 3/2006 | Vandorpe et al. | 359/834 |
| 2007/0297052 A1 | 12/2007 | Wang et al. | |
| 2012/0170000 A1 * | 7/2012 | Imaoka | G02B 27/283 353/20 |
| 2014/0085609 A1 * | 3/2014 | Vermeirsch et al. | 353/8 |

* cited by examiner

# WAVELENGTH SEPARATION DEVICE AND 3-DIMENSIONAL IMAGE ACQUISITION APPARATUS INCLUDING THE SAME

CROSS-REFERENCE TO RELATED APPLICATION

This application claims the benefit of Korean Patent Application No. 10-2013-0149996, filed on Dec. 4, 2013, in the Korean Intellectual Property Office, the disclosure of which is incorporated herein in its entirety by reference.

BACKGROUND

1. Field

Apparatuses consistent with exemplary embodiments relate to wavelength separation devices and 3-dimensional (3D) image acquisition apparatuses including the same, and more particularly, to wavelength separation devices capable of making uniform the light intensity distribution of separated reflected light, and 3D image acquisition apparatuses including the same.

2. Description of the Related Art

Recently, 3-dimensional (3D) content has become more significant along with the development and increasing demand for 3D display apparatuses capable of displaying an image having a sense of depth. Accordingly, research is being conducted into various 3D image acquisition apparatuses, such as 3D cameras, that enable users to personally produce 3D content. The 3D cameras have to be able to obtain depth information together with conventional 2-dimensional (2D) color image information through a single photographing operation.

A binocular stereo vision method using two cameras or a triangulation method using structured light and a camera may be used to obtain depth information about the distances between a 3D camera and the surfaces of an object. However, in these methods, it is difficult to obtain accurate depth information because the accuracy of depth information depends on the surface state of an object and degrades rapidly as the distance to the object increases.

In order to solve this problem, a time-of-flight (TOF) method has been introduced. TOF technology is a method of measuring the flight time of light between when illumination light is direction to an object until the light reflected from the object is received by a light-receiving unit. According to the TOF technology, an illumination optical system, including a light-emitting diode (LED) or a laser diode (LD), is used to project light of a certain wavelength (e.g., 850 nm near-infrared light) onto an object, light of the same wavelength reflected from the object is received by a light-receiving unit, and then a series of processing operations, such as modulation of the received light by a modulator having a known gain waveform, are performed to extract depth information. According to such a series of optical processing operations, various TOF technologies have been introduced.

In general, a 3D camera employing a TOF technology includes an illumination optical system for emitting illumination light of an infrared wavelength band, and an imaging optical system for acquiring an image of an object in order to obtain depth information. The imaging optical system generates a typical color image by sensing a visible light reflected from an object, and simultaneously generates a depth image having only depth information by sensing an illumination light of an infrared wavelength band reflected from the object. To this end, the imaging optical system may include a color image sensor and a separate depth image sensor. In this structure, various methods are proposed to allow a color image and a depth image to have the same viewing angle. For example, a beam splitter may be used to separate a visible light and an illumination light, direct the visible light to the color image sensor, and direct the illumination light to the depth image sensor.

SUMMARY

One or more exemplary embodiments may provide wavelength separation devices capable of uniformizing the light intensity distribution of separated reflected lights and 3-dimensional (3D) image acquisition apparatuses including the same.

Additional exemplary aspects and advantages will be set forth in part in the description which follows and, in part, will be apparent from the description, or may be learned by practice of the presented embodiments.

According to an aspect of an exemplary embodiment, a wavelength separation device includes: a first prism comprising a light entrance surface, a light exit surface, and an inclined surface between the light entrance surface and the light exit surface; a second prism that is smaller than the first prism and is bonded to a first portion of the inclined surface of the first prism; and a wavelength separation coating that is disposed at a junction region between the first portion of the inclined surface of the first prism and the second prism to reflect light in a first wavelength band and transmit light in a second wavelength band, wherein a second portion of the inclined surface of the first prism, different from the first portion and adjacent to the light entrance surface is a total reflection surface that totally internally reflects incident light.

A width of the second prism in a first direction parallel to the light entrance surface of the first prism may be smaller than a width of the first prism in the first direction, and the first prism and the second prism may be disposed such that a central axis of the second prism and a central axis of the first prism are aligned.

The first prism may have a shape that is formed by cutting and removing a third portion of the inclined surface of the first prism, different from the first portion and the second portion and adjacent to the light exit surface.

The second prism may include a light exit surface and an inclined surface that is adjacent to the light exit surface.

The inclined surface of the second prism may be bonded to the first portion of the inclined surface of the first prism.

The wavelength separation device may further include an anti-reflection coating that is disposed on each of the light entrance surface of the first prism, the light exit surface of the first prism, and the light exit surface of the second prism.

The wavelength separation device may be configured such that light in the first wavelength band and light in the second wavelength band are incident on the light entrance surface of the first prism; light in the first wavelength band, which is reflected by the wavelength separation coating, and light in the first wavelength band and light in the second wavelength band, which are totally reflected by the total reflection surface of the first prism, exit through the light exit surface of the first prism; and light in the second wavelength band, which is transmitted through the wavelength separation coating, exits through the light exit surface of the second prism.

The second wavelength band may be shorter than the first wavelength band.

For example, the first wavelength band may be an infrared wavelength band, and the second wavelength band may be a visible wavelength band.

According to an aspect of another exemplary embodiment, a 3D image acquisition apparatus includes: a light source that generates light in a first wavelength band; a first imaging unit that provides a first image signal by using light in the first wavelength band that is reflected from an external object; a second imaging unit that provides a second image signal by using light in a second wavelength band that is reflected from the external object; an image signal processing unit that generates a 3D image by using the first image signal and the second image signal; and a wavelength separation device that has the above structure to separate the light in the first wavelength band and the light in the second wavelength band and provide the light in the first wavelength band and the light in the second wavelength band to the first imaging unit and the second imaging unit, respectively.

The light source may be disposed to be adjacent to a side surface of the second prism and to face the total reflection surface of the first prism.

The 3D image acquisition apparatus may further include a light diffusion device that is disposed between the light source and the total reflection surface of the first prism.

The light diffusion device may include a light exit surface on which a light diffusion surface is formed.

The light diffusion surface of the light diffusion device may be disposed to face the total reflection surface of the first prism.

Also, the light diffusion device may be spaced apart from the first prism.

Also, the first imaging unit may include: an objective lens that focuses light in the first wavelength band; a band-pass filter that transmits only light in the first wavelength band; an optical shutter that amplitude-modulates light in the first wavelength band; and an image sensor that senses a modulated illumination light to generate the first image signal.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
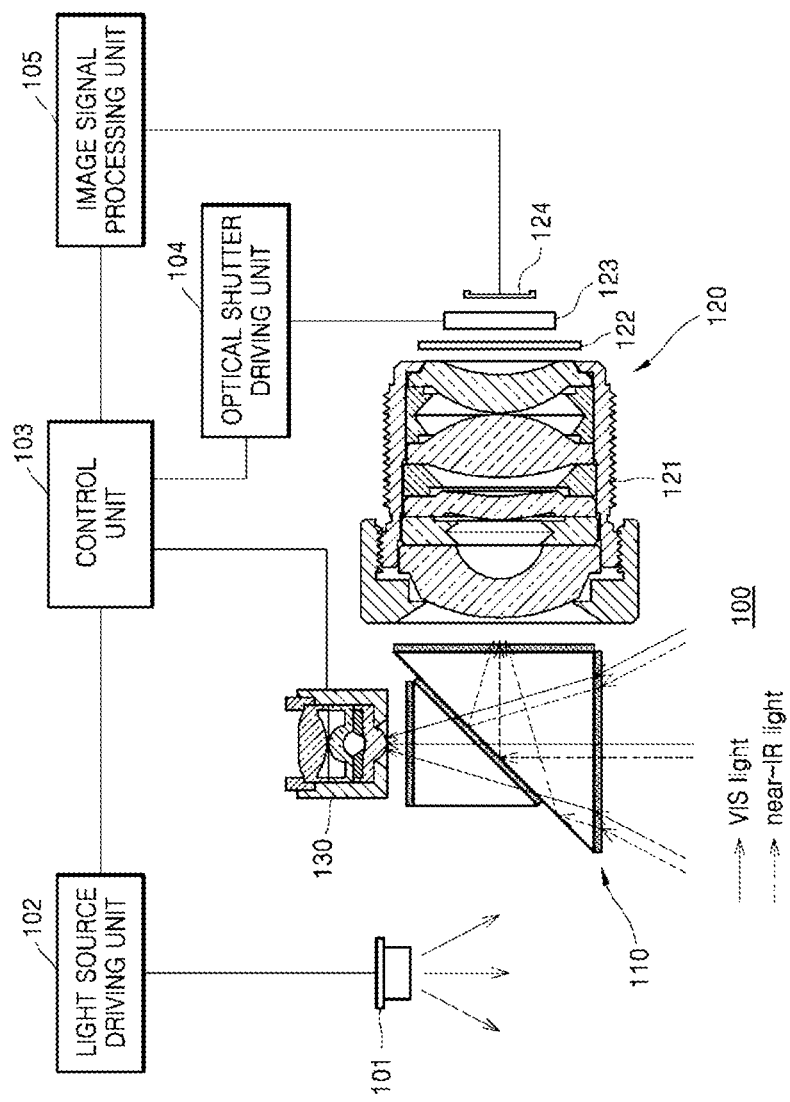
FIG. 1 is a schematic conceptual diagram illustrating an exemplary configuration of a 3-dimensional (3D) image acquisition apparatus according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Hereinafter, wavelength separation devices and 3-dimensional image acquisition apparatuses including the same will be described in detail with reference to the accompanying drawings. In the drawings, like reference numerals denote like elements, and the sizes of components may be exaggerated for clarity. The embodiments described hereinafter are merely exemplary, and various changes and modifications may be made therein. It will be understood that when a layer is referred to as being "on" another layer, it may be directly on the other layer, or one or more intervening layers may also be present.

FIG. 1 is a schematic conceptual diagram illustrating an exemplary configuration of a 3D image acquisition apparatus 100 according to an exemplary embodiment. Referring to FIG. 1, the 3D image acquisition apparatus 100 may include a light source 101 that generates illumination light of a predetermined wavelength band, a first imaging unit 120 that provides a depth image signal by using illumination light that is reflected from an external object (not illustrated), a second imaging unit 130 that provides a color image signal by using visible light that is reflected from the external object, an image signal processing unit 105 that generates a 3D image by using the depth image signal and the color image signal, and a wavelength separation device 110 that separates the illumination light and the visible light and provides the illumination light and the visible light to the first imaging unit 120 and the second imaging unit 130, respectively.

The first imaging unit 120 may include an objective lens 121 that focuses illumination light; a band-pass filter 122 that transmits only light having a wavelength corresponding to a wavelength of the illumination light from light incident thereon, an optical shutter 123 that amplitude-modulates illumination light according to a time-of-flight (TOF) method, and an image sensor 124 that senses modulated illumination light to generate a depth image signal. The optical shutter 123 may be a modulator that has a driving rate of several tens of MHz to several hundreds of MHz in order to obtain accurate depth information. For example, the optical shutter 123 may include an image intensifier tube having a multi-channel plate (MCP), a GaAs-based semiconductor modulator device, and a thin-film modulator device using an electro-optic material.

Although not illustrated in FIG. 1, the second imaging unit 130 may include an objective lens that focuses visible light, a band-pass filter that transmits only a wavelength component of visible light, and an image sensor that senses visible light to generate a color image signal. The image sensor 124 of the first imaging unit 120 and the image sensor of the second imaging unit 130 may be semiconductor imaging devices such as charge-coupled devices (CCDs) or complementary metal oxide semiconductor (CMOS) devices. The image sensor 124 of the first imaging unit 120 may be a black-and-white image sensor that may sense only the brightness and darkness of light, and the image sensor of the second imaging unit 130 may be a color image sensor that may sense colors.

The 3D image acquisition apparatus 100 may further include a control unit 103 that is configured to control an operation of the light source 101, an operation of the optical shutter 123, an operation of the first imaging unit 120, an operation of the second imaging unit 130, and an operation of the image signal processing unit 105, a light source driving unit 102 that drives the light source 101 under the control of the control unit 103, and an optical shutter driving unit 104 that drives the optical shutter 123 under the control of the control unit 103.

For example, the light source 101 may include a light emitting diode (LED) or a laser diode (LD) that may emit illumination light having about an 850 nm near-infrared (NIR) wavelength that is invisible to the human eye to protect it. However, this is merely exemplary, and illumination light of a different suitable wavelength band and a different type of light source may be used according to design. Also, the light source 101 may emit illumination light having a specially-defined waveform, such as a sine wave, a ramp wave, and a square wave, according to a control signal received from the light source driving unit 102.

Hereinafter, an operation of the 3D image acquisition apparatus 100 will be described. First, under the control of the control unit 103, the light source driving unit 102 provides a driving signal having a predetermined period and wavelength to the light source 101. Then, the light source 101 projects illumination light, of an NIR wavelength band having the same period and wavelength as the driving signal, onto an object. For example, the light source 101 may sequentially irradiate illumination light at least three times, the different times of illumination light having the same period and different phases, onto the object according to the TOF method. Thereafter, incident light reflected from the object is incident onto the wavelength separation device 110. At this time, visible light reflected from the object may be simultaneously incident onto the wavelength separation device 110. The wavelength separation device 110 may separate incident light according to wavelength and provide the reflected illumination light to the first imaging unit 120, while providing visible light to the second imaging unit 130.

For example, visible light may be provided to the second imaging unit 130 through the wavelength separation device 110, and illumination light of an NIR wavelength band may be reflected by the wavelength separation device 110 and provided to the first imaging unit 120. The second imaging unit 130 may receive the visible light, which has passed the wavelength separation device 110, generate a color image signal, and provide the color image signal to the image signal processing unit 105. The first imaging unit 120 may modulate the illumination light, which has been reflected from the wavelength separation device 110, by the optical shutter 123, sense the illumination light to generate a depth image signal using the image sensor 124, and provide the depth image signal to the image signal processing unit 105. The image signal processing unit 105 may extract depth information of the object from the depth image signal according to the TOF method, and generate a 3D image by combining the depth information with a color image.

The 3D image acquisition apparatus 100 according to the present embodiment has no parallax between the depth image and the color image because it provides the illumination light and the visible light, which have been incident onto the wavelength separation device 110, to the first imaging unit 120 and the second imaging unit 130 respectively. Thus, since a viewing angle of the depth image and a viewing angle of the color image are aligned with each other, via the wavelength separation device, it is not necessary to perform a separate image processing operation for aligning the viewing angle of the depth image and the viewing angle of the color image with each other. Also, since the objective lens 121 of the first imaging unit 120 and the objective lens of the second imaging unit 130 are independently used, the objective lenses may be designed to be optimized for the color image and the depth image respectively.

FIG. 1 illustrates that the wavelength separation device 110 transmits the visible light and reflects the illumination light. However, the wavelength separation device 110 may alternately be configured to reflect the visible light and transmit the illumination light. As illustrated in FIG. 1, when the wavelength separation device 110 is configured to transmit the visible light and reflect the illumination light, the thickness of the 3D image acquisition apparatus may be made to be smaller than a case in which the wavelength separation device is configured to transmit the illumination light and reflect the visible light. In general, the objective lens 121 of the first imaging unit 120 may be a bright lens having a small F number for the accuracy of the depth information. Thus, the objective lens 21 of the first imaging unit 120 is generally larger and longer than the objective lens of the second imaging unit 130. Thus, when the objective lens 121 of the first imaging unit 120 is disposed to be substantially perpendicular to the incident direction of the incident light, the thickness of the 3D image acquisition apparatus 100 may be smaller than a case in which the wavelength separation device is configured to transmit the illumination light and reflect the visible light. Thus, the 3D image acquisition apparatus 100 according to the present embodiment may be easily applied to a television (TV), a game, or a 3D camera that has a 3D motion recognition function. In the following description, it is assumed that the wavelength separation device 110 transmits the visible light and reflects the illumination light.

In general, the wavelength separation device 110 may use a flat panel-type dichroic minor or a cube-type beam splitter that is formed by joining two prisms having the same size. However, when the wavelength separation device 110 uses a flat panel-type dichroic minor, it may be difficult to reduce the thickness of the 3D image acquisition apparatus 100 since there is a large amount of unused space. Also, in the case of a cube-type beam splitter, a wavelength separation coating is disposed between two prisms to reflect the illumination light and transmit the visible light. However, it may be very difficult to design the wavelength separation coating to have the same reflectance with respect to incident lights of all angles. For example, the reflection efficiency of the wavelength separation coating may be low with respect to illumination light of an infrared wavelength band that is incident at a high incident angle (i.e., that is incident at an angle). Accordingly, the illumination light may be partially lost, and the light intensity distribution of the reflected illumination light may be non-uniform.

Figure 2:
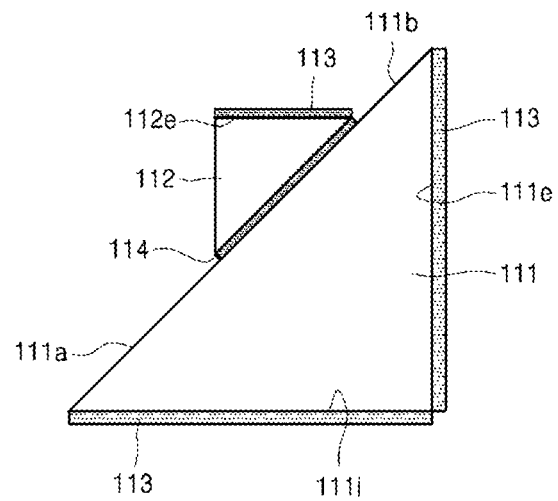
FIG. 2 is a cross-sectional view illustrating a detailed configuration of a wavelength separation device of the 3D image acquisition apparatus illustrated in FIG. 1.

The 3D image acquisition apparatus 100 according to the present embodiment may include the wavelength separation device 110 that may make uniform the light intensity distribution of the reflected illumination light while reducing the size thereof. FIG. 2 is a cross-sectional view illustrating a detailed configuration of the wavelength separation device 110 of the 3D image acquisition apparatus 100, and FIG. 3 is a perspective view of the wavelength separation device 110.

Figure 3:
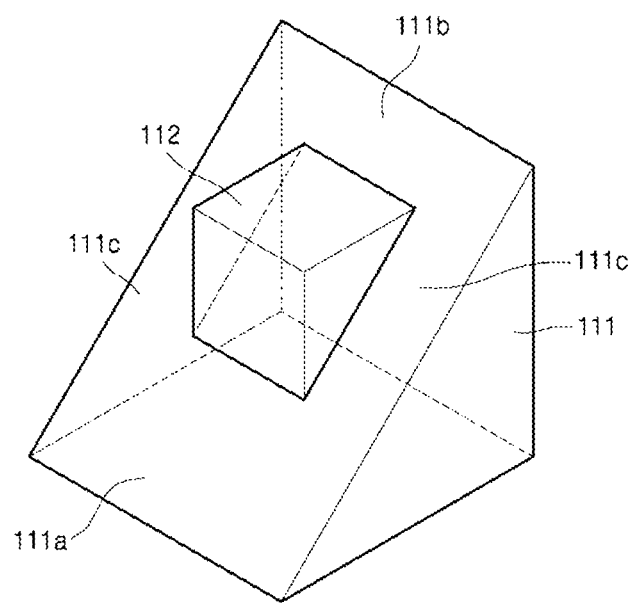
FIG. 3 is a perspective view illustrating a detailed configuration of the wavelength separation device of the 3D image acquisition apparatus illustrated in FIG. 1.

Referring to FIGS. 2 and 3, the wavelength separation device 110 according to the present embodiment may include two prisms 111 and 112 that have different sizes. The first prism 111 includes a light entrance surface 111*i* onto which both visible light and illumination light are incident, a light exit surface 111e through which reflected illumination light exits, and an inclined surface between the light entrance surface 111i and the light exit surface 111e. Also, the second prism 112 includes a light exit surface 112e through which transmitted visible light exits, and an inclined surface that is adjacent to the light exit surface 112e. The first prism 111 is larger than the second prism 112, and the inclined surface of the second prism 112 is bonded to a portion of the inclined surface of the first prism 111. A wavelength separation coating 114 is disposed at a junction region between the first prism 111 and the second prism 112 to transmit visible light having a short wavelength and reflect infrared illumination light having a long wavelength. Also, an anti-reflection coating 113 may be disposed at the light entrance surface 111i and the light exit surface 111e of the first prism 111 and the light exit surface 112e of the second prism 112.

As illustrated in FIGS. 2 and 3, since the second prism 112 is smaller than the first prism 111, the inclined surface of the second prism 112 is bonded to only a portion of the inclined surface of the first prism 111. As a result, the other portion of the inclined surface of the first prism 111 contacts air that has a low refractive index. Thus, the other portion of the inclined surface of the first prism 111 will totally internally reflect light that is incident on the inclined surface of the first prism 111 at a high incident angle. For example, a first surface 111a of the inclined surface of the first prism 111, which is adjacent to the light entrance surface 111i and is not bonded to the second prism 112, and a second surface 111b, which is not bonded to the second prism 112, may be total internal reflection surfaces at which total internal reflection occurs.

However, the light totally internally reflected by the second surface 111b is not incident onto the first imaging unit 120 or the second imaging unit 130 and is discarded. Thus, since the second surface 111b is optically unavailable, a vertex region of the first prism 111 including the second surface 111b may be cut and removed as illustrated in a cross-sectional view of FIG. 4A and a perspective view of FIG. 4B. Thus, the thickness and weight of the 3D image acquisition apparatus 100 may be further reduced by reducing the volume and weight of the wavelength separation device 110.

Figure 4A:
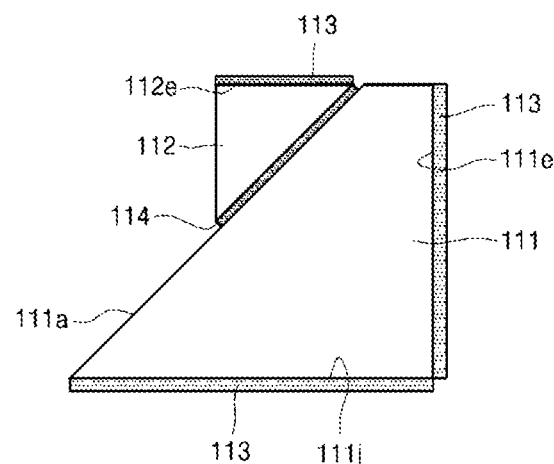
FIG. 4A is a cross-sectional view illustrating a configuration of a wavelength separation device according to another exemplary embodiment.
Figure 4B:
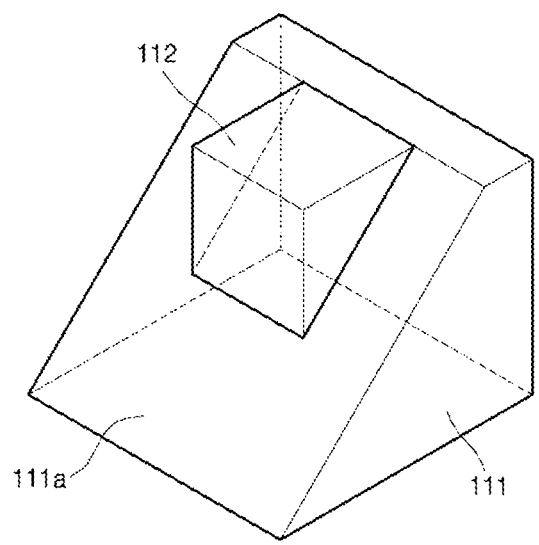
FIG. 4B is a perspective view illustrating a configuration of the wavelength separation device according to another exemplary embodiment.

Also, since visible light that is transmitted through both edges 111c of the inclined surface of the first prism 111 is not used in the second imaging unit 130, the width of the second prism 112 may be made to be smaller than the width of the first prism 111, and the first prism 111 and the second prism 112 may be disposed such that a central axis of the second prism 112 and a central axis of the first prism 111 are aligned with each other, as illustrated in FIGS. 3 and 4B. Thus, the volume and weight of the wavelength separation device 110 may be further reduced by reducing the width of the second prism 112.

Figure 5A:
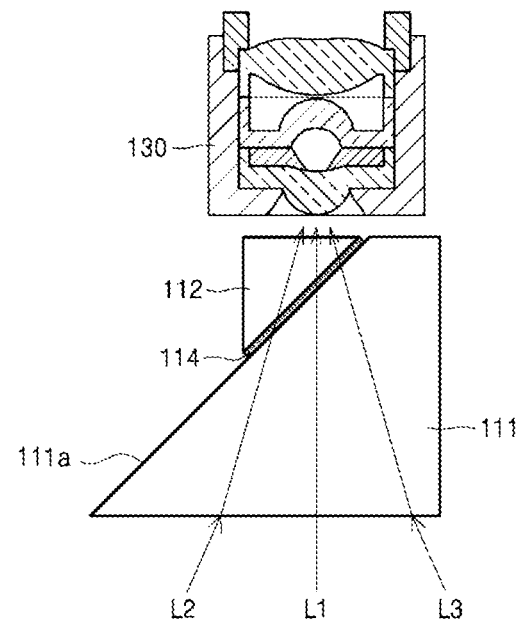
FIG. 5A schematically illustrates a path of a transmitted light that is transmitted through the wavelength separation device illustrated in FIGS. 4A and 4B.

FIG. 5A schematically illustrates a path of light that is transmitted through the wavelength separation device 110 illustrated in FIGS. 4A and 4B. Referring to FIG. 5A, light is incident from the outside of the 3D image acquisition apparatus 100 onto the light entrance surface 111i of the first prism 111 at various angles. Visible light and illumination light that are reflected from the object may make up the light incident on the light entrance surface 111i. FIG. 5A illustrates only light components having one of three different incident angles among all angles of light incident on the light entrance surface 111i. That is, FIG. 5A illustrates a first light component L1 that is incident at an angle normal to the light entrance surface 111i, a second light component L2 that is incident at a negative (−) angle with respect to the first light component, and a third light component L3 that is incident at a positive (+) angle with respect to the first light component.

The first, second and third light components L1, L2 and L3 may be incident onto the light entrance surface 111i of the first prism 111, travel through the first prism 111, and then be incident onto the wavelength separation coating 114 that is disposed at the junction region between the first prism 111 and the second prism 112. As described above, the wavelength separation coating 114 may be configured to transmit the visible light and reflect the infrared light. Thus, the visible light among the first, second and third light components L1, L2 and L3 may pass through the wavelength separation coating 114 and travel through the second prism 112. Thereafter, the visible light may exit through the light exit surface 112e of the second prism 112 and be incident onto the second imaging unit 130. The second imaging unit 130 may sense the visible light to generate a color image signal.

Figure 5B:
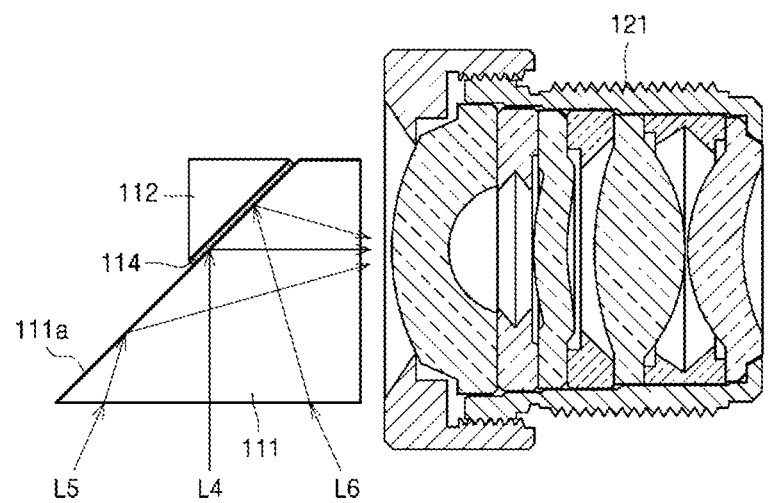
FIG. 5B schematically illustrates a path of a reflected light that is reflected by the wavelength separation device illustrated in FIGS. 4A and 4B.

FIG. 5B schematically illustrates a path of light that is reflected by the wavelength separation device 110 illustrated in FIGS. 4A and 4B. FIG. 5B illustrates a fourth light component L4 that is incident at an angle normal to the light entrance surface 111i, a fifth light component L5 that is incident at a negative (−) angle with respect to the fourth light component, and a sixth light component L6 that is incident at a positive (+) angle with respect to the fourth light component. Referring to FIG. 5B, the fourth and sixth light components L4 and L6, among the fourth, fifth and sixth light components L4, L5 and L6, are be incident onto the light entrance surface 111i of the first prism 111, travel through the first prism 111, and then are incident on the wavelength separation coating 114 that is disposed at the junction region between the first prism 111 and the second prism 112. Infrared illumination light in the fourth and sixth light components L4 and L6 may be reflected by the wavelength separation coating 114, exit through the light exit surface 111e of the first prism 111, and then be incident onto the first imaging unit 120.

The fifth light component L5 is incident onto the light entrance surface 111i of the first prism 111, travels through the first prism 111, and then is incident onto the first surface 111a of the first prism 111. Herein, the fifth light component L5 is totally internally reflected by the first surface 111a. Thus, regardless of the wavelengths of light in the fifth light component, all of the fifth light component L5 exits through the light exit surface 111e of the first prism 111. However, only the illumination light among the fifth light component L5 exiting through the light exit surface 111e of the first prism 111 passes through the band-pass filter 122 of FIG. 1 and is incident onto the first imaging unit 120. Thus, the first imaging unit 120 may sense the infrared illumination light in the fourth, fifth and sixth light components to generate a depth image signal. Since the visible light among the fifth light component L5 does not contribute to generating the color image signal of the second imaging unit 130, it does not affect the performance of the second imaging unit 130 even when disappearing after being totally internally reflected by the first surface 111a of the first prism 111.

Figure 6:
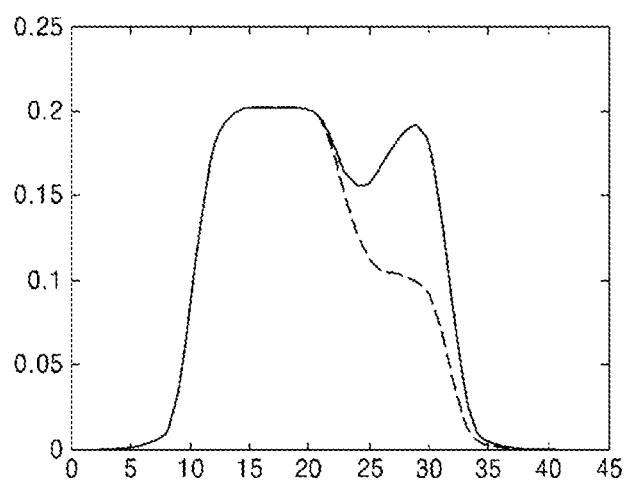
FIG. 6 is a graph illustrating a light intensity distribution profile of a reflected light that is reflected by the wavelength separation device illustrated in FIGS. 4A and 4B.

FIG. 6 is a graph illustrating a light intensity distribution profile of light that is reflected by the wavelength separation device 110 illustrated in FIGS. 4A and 4B. For example, the solid line of FIG. 6 represents a light intensity distribution profile of illumination light reflected by the wavelength separation device 110 according to the present embodiment; the dotted line represents a light intensity distribution profile of illumination light reflected by the cube-type beam splitter in which the wavelength separation coating 114 is formed throughout the junction region between two prisms having the same size. Also, in FIG. 6, a horizontal axis represents a cross-sectional direction of a reflected light, and a vertical axis represents the intensity of the reflected light. As described above, the reflection efficiency of the wavelength separation coating 114 is low with respect to the infrared illumination light that is incident at an angle. Thus, in the case of the cube-type beam splitter, since the illumination light in the fifth light component L5 illustrated in FIG. 5B is lost, a non-uniform light intensity distribution profile is formed as represented by a dotted-line graph of FIG. 6. However, in the case of the wavelength separation device 110 according to the present embodiment, since the fifth light component L5 is totally reflected, the illumination light that is incident at an angle is not lost. Thus, since a uniform light intensity distribution profile may be formed as represented by a solid-line graph of FIG. 6, the accuracy of the depth information may be improved.

Figure 7:
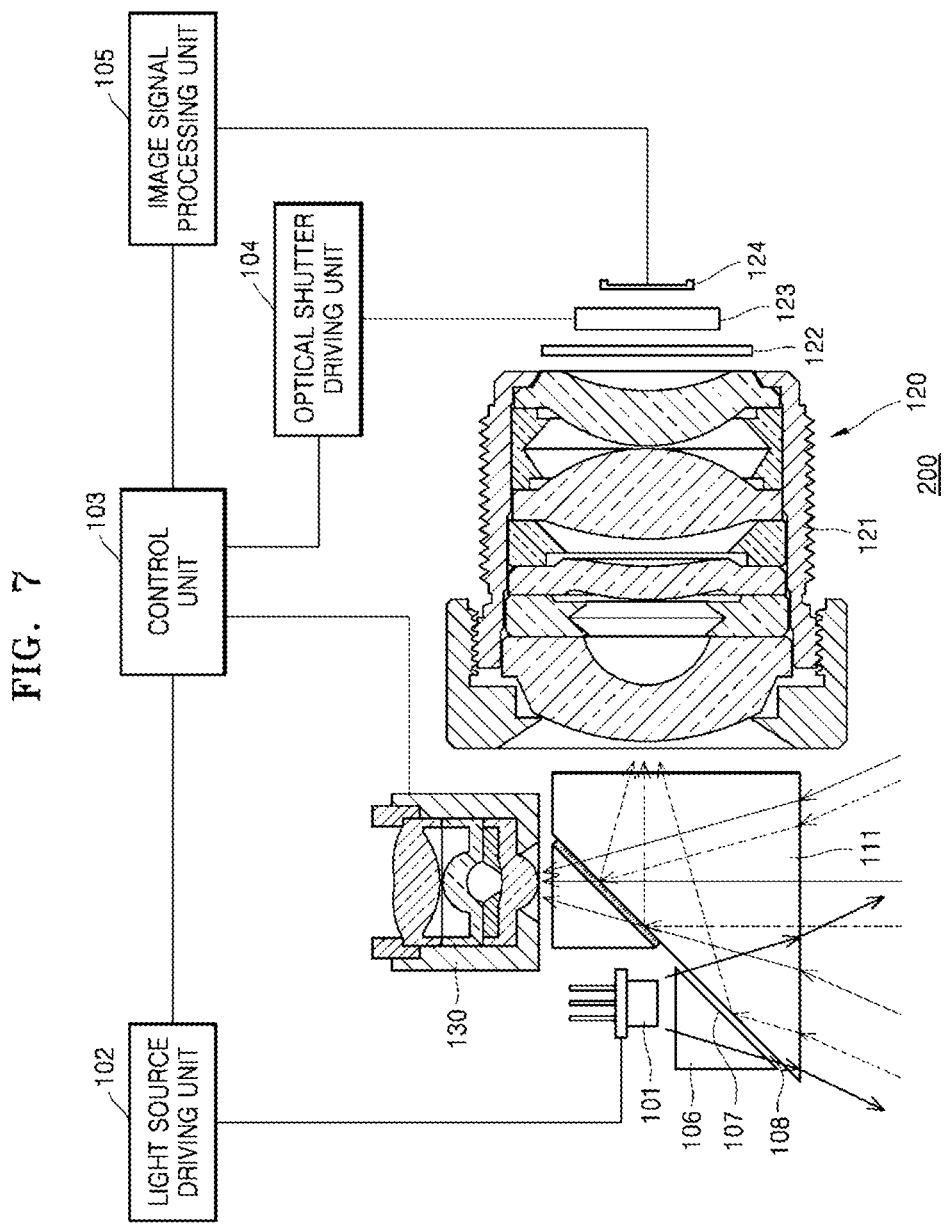
FIG. 7 is a schematic conceptual diagram illustrating an exemplary configuration of a 3D image acquisition apparatus according to another exemplary embodiment.

FIG. 7 is a schematic conceptual diagram illustrating an exemplary configuration of a 3D image acquisition apparatus 200 according to another embodiment. In the case of the wavelength separation device 110 according to the present embodiment, since the second prism 112 smaller than the first prism 111 is bonded to the first prism 111, an empty space may be formed on the first surface 111a of the inclined surface of the first prism 111, which is adjacent to the light entrance surface 111i and is not bonded to the second prism 112. Thus, when the light source 101 is disposed in the empty space of the wavelength separation device 110, the size of the 3D image acquisition apparatus 200 may be further reduced.

To this end, as illustrated in FIG. 7, the light source 101 may be disposed to be adjacent to a side surface of the second prism 112 to face the first surface 111a of the first prism 111, and a prism-type light diffusion device 106 may be further disposed between the light source 101 and the first surface 111a of the first prism 111. For example, a light diffusion surface 107 may be formed at a light exit surface that is an inclined surface of the prism-type light diffusion device 106. The light diffusion surface 107 of the light diffusion device 106 may be disposed to face the first surface 111a of the first prism 111. In this configuration, illumination light emitted from the light source 101 may be diffused by the light diffusion device 106, and the diffused light may be projected through the first prism 111 to the outside of the 3D image acquisition apparatus 200. A gap 108 may be provided between the light diffusion device 106 and the first surface 111a of the first prism 111 so that the light incident into the first prism 111 may be totally internally reflected by the first surface 111a. That is, the light diffusion device 106 may be spaced apart from the first prism 111 by the gap 108 without being bonded to the first prism 111.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims.

What is claimed is:

1. A wavelength separation device comprising:
a first prism comprising a light entrance surface, a light exit surface, and an inclined surface between the light entrance surface and the light exit surface;
a second prism that is smaller than the first prism and is bonded to a first portion of the inclined surface of the first prism; and
a wavelength separation coating that is disposed at a junction between the first portion of the inclined surface of the first prism and the second prism, wherein the wavelength separation coating reflects light in a first wavelength band and transmits light in a second wavelength band,
wherein a second portion of the inclined surface of the first prism, different from the first portion and adjacent to the light entrance surface, is a total reflection surface that totally internally reflects light incident thereon,
wherein the second prism is disposed on the first portion of the inclined surface of the first prism and is not disposed on the second portion of the inclined surface of the first prism, and
wherein the wavelength separation device is configured such that, of light incident on the light entrance surface of the first prism:
light in the first wavelength band which is reflected by the wavelength separation coating exits the wavelength separation device through the light exit surface of the first prism;
light in the first wavelength band and light in the second wavelength band which are totally internally reflected by the total reflection surface of the first prism exit the wavelength separation device through the light exit surface of the first prism; and
light in the second wavelength band which is transmitted through the wavelength separation coating exits the wavelength separation device through the second prism.

2. The wavelength separation device of claim 1, wherein a width of the second prism in a first direction parallel to the light entrance surface of the first prism, is smaller than a width of the first prism in the first direction, and the first prism and the second prism are disposed such that a central optical axis of the second prism and a central optical axis of the first prism are aligned.

3. The wavelength separation device of claim 1, wherein the first prism has a shape that is formed by cutting and removing a third portion of the inclined surface, different from the first portion and the second portion and adjacent to the light exit surface.

4. The wavelength separation device of claim 1, wherein the second prism comprises a light exit surface and an inclined surface that is adjacent to the light exit surface.

5. The wavelength separation device of claim 4, wherein the inclined surface of the second prism is bonded to the first portion of the inclined surface of the first prism.

6. The wavelength separation device of claim 4, further comprising an anti-reflection coating that is disposed on each of the light entrance surface of the first prism, the light exit surface of the first prism, and the light exit surface of the second prism.

7. The wavelength separation device of claim 1, wherein the second wavelength band comprises wavelengths which are shorter than wavelengths of the first wavelength band.

8. The wavelength separation device of claim 7, wherein the first wavelength band comprises infrared wavelengths, and the second wavelength band comprises visible wavelengths.

9. A 3-dimensional (3D) image acquisition apparatus comprising:
a light source that generates light in a first wavelength band;

a first imaging unit that generates a first image signal using light in the first wavelength band reflected from an external object;

a second imaging unit that generates a second image signal using light in a second wavelength band reflected from the external object;

an image signal processing unit that generates a 3D image using the first image signal and the second image signal; and a wavelength separation device that separates light in the first wavelength band from and light in the second wavelength band, provides light in the first wavelength band to the first imaging unit and provides light in the second wavelength band to the second imaging unit, the wavelength separation device comprising:

a first prism comprising a light entrance surface, a light exit surface, and an inclined surface between the light entrance surface and the light exit surface;

a second prism that is smaller than the first prism and is bonded to a first portion of the inclined surface of the first prism; and a wavelength separation coating that is disposed at a junction between the first portion of the inclined surface of the first prism and the second prism, wherein the wavelength separation coating reflects light in the first wavelength band and transmits light in the second wavelength band, wherein a second portion of the inclined surface of the first prism, different from the first portion and adjacent to the light entrance surface, is a total reflection surface that totally internally reflects light incident thereon, wherein the second prism is disposed on the first portion of the inclined surface of the first prism and is not disposed on the second portion of the inclined surface of the first prism, and wherein the wavelength separation device is configured such that, of light incident on the light entrance surface of the first prism;

light in the first wavelength band which is reflected by the wavelength separation coating exits the wavelength separation device through the light exit surface of the first prism;

light in the first wavelength band and light in the second wavelength band which are totally internally reflected by the total reflection surface of the first prism exit the wavelength separation device through the light exit surface. of the first prism: and light in the second wavelength band which is transmitted through the wavelength separation coating exits the wavelength separation device through the second prism.

10. The 3D image acquisition apparatus of claim 9, wherein a width of the second prism in a first direction parallel to the light entrance surface of the first prism, is smaller than a width of the first prism in the first direction, and the first prism and the second prism are disposed such that a central optical axis of the second prism and a central optical axis of the first prism are aligned.

11. The 3D image acquisition apparatus of claim 9, wherein the first prism has a shape that a third portion of the inclined surface, different form the first portion and the second portion and adjacent to the light exit surface is removed.

12. The 3D image acquisition apparatus of claim 9, wherein the second prism comprises a light exit surface and an inclined surface that is adjacent to the light exit surface, and the inclined surface of the second prism is bonded to the first portion of the inclined surface of the first prism.

13. The 3D image acquisition apparatus of claim 12, wherein the wavelength separation device further comprises an anti-reflection coating that is disposed on each of the light entrance surface of the first prism, the light exit surface of the first prism, and the light exit surface of the second prism.

14. The 3D image acquisition apparatus of claim 9, wherein the second wavelength band comprises wavelengths which are shorter than wavelengths of the first wavelength band.

15. The 3D image acquisition apparatus of claim 9, wherein the light source is adjacent to a side surface of the second prism and faces the total reflection surface of the first prism.

16. The 3D image acquisition apparatus of claim 15, further comprising a light diffusion device disposed between the light source and the total reflection surface of the first prism, wherein the light diffusion device comprises a light exit surface on which a light diffusion surface is formed, the light diffusion surface of the light diffusion device faces the total reflection surface of the first prism, and the light diffusion device is spaced apart from the first prism.

17. The 3D image acquisition apparatus of claim 9, wherein the first imaging unit comprises:

an objective lens that focuses light in the first wavelength band;

a band-pass filter that transmits only light in the first wavelength band;

an optical shutter that amplitude-modulates light in the first wavelength band; and an image sensor that senses a modulated illumination light and generates the first image signal.

18. A wavelength separation device comprising:

a first prism comprising a light entrance surface, a light exit surface which is substantially perpendicular to the light entrance surface, and an inclined surface extending between the light entrance surface and the light exit surface;

a second prism comprising a light exit surface and an inclined surface, wherein the inclined surface of the second prism is bonded to the inclined surface of the first prism; and a wavelength separation coating disposed between the inclined surface of the second prism and the first portion of the inclined surface of the first prism, wherein the wavelength separation coating reflects light in a first wavelength band and transmits light in a second wavelength band, different from the first wavelength band, wherein the inclined surface of the second prism is smaller than the inclined surface of the first prism such that the inclined surface of the first prism comprises a first portion on which the second prism is disposed and a second portion on which the second prism is not disposed, the second portion being a total reflection surface that totally internally reflects light incident thereon, and wherein the wavelength separation device is configured such that, of light incident on the light entrance surface of the first prism:

light in the first wavelength band which is reflected by the wavelength separation coating exits the wavelength separation device through the light exit surface of the first prism:

light in the first wavelength band and light in the second wavelength band which are totally internally reflected by the total reflection surface of the first prism exit the wavelength separation device through the light exit surface of the first prism; and light in the second wavelength band which is transmitted through the wavelength separation coating exits the wavelength separation device through the light exit surface of the second prism.

\* \* \* \* \*